(12) United States Patent
Hoffman et al.

(10) Patent No.: US 8,244,760 B2
(45) Date of Patent: Aug. 14, 2012

(54) SEGMENTATION AND PROFILING OF USERS

(75) Inventors: Adam Paul Hoffman, Bellevue, WA (US); Marcus K. Swenson, Duvall, WA (US); Layla M. Driscoll, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 12/631,756

(22) Filed: Dec. 4, 2009

(65) Prior Publication Data

US 2011/0137941 A1 Jun. 9, 2011

(51) Int. Cl.
*G06F 7/00* (2006.01)

(52) U.S. Cl. ...................................................... 707/783

(58) Field of Classification Search .................. None
See application file for complete search history.

(56) References Cited

U.S. PATENT DOCUMENTS

| | | | |
|---|---|---|---|
| 6,871,196 B1 | 3/2005 | Chan et al. | |
| 7,165,105 B2 | 1/2007 | Reiner et al. | |
| 2001/0013009 A1* | 8/2001 | Greening et al. | 705/10 |
| 2002/0035568 A1 | 3/2002 | Benthin et al. | |
| 2007/0100796 A1 | 5/2007 | Wang | |
| 2007/0112717 A1* | 5/2007 | Serrano-Morales et al. | 706/47 |
| 2008/0010281 A1 | 1/2008 | Berkhin et al. | |
| 2008/0091517 A1 | 4/2008 | Koonce et al. | |
| 2008/0288491 A1 | 11/2008 | Wu et al. | |
| 2009/0125377 A1 | 5/2009 | Somji et al. | |
| 2009/0132559 A1 | 5/2009 | Chamberlain et al. | |
| 2009/0182718 A1 | 7/2009 | Waclawik et al. | |
| 2009/0198711 A1 | 8/2009 | Datar et al. | |
| 2009/0248680 A1 | 10/2009 | Kalavade | |
| 2011/0138401 A1 | 6/2011 | Hoffman | |

OTHER PUBLICATIONS

Analyzing Population Segments—Published Date: 2009 http://msdn.microsoft.com/en-us/library/ms865190.aspx (1 page).
Increasing Portal Adoption with User Scenarios—Published Date: May 16, 2007 http://www.intranetjournal.com/articles/200705/pij_05_16_07a.html (4 pages).
Using Prediction in Web Site Management—Published Date 2009 http://msdn.microsoft.com/en-us/library/ms936577.aspx (3 pages).
Commerce Server 2002 Technical Overview—Published Date: Mar. 1, 2005 http://technet.microsoft.com/en-us/commerceserver/bb643776.aspx (16 pages).
Hofgesang; Web Personalisation through Incremental Individual Profiling and Support-based User Segmentation—Retrieved Date: Oct. 12, 2009 http://www.few.vu.nl/~hpi/papers/hofgesang07web.pdf (8 pages).
Project Description—Retrieved Date: Oct. 12, 2009 http://www.cs.umd.edu/class/spring2003/cmsc838p/General/itrProposal.pdf (15 pages).

* cited by examiner

*Primary Examiner* — Truong Vo
(74) *Attorney, Agent, or Firm* — Workman Nydegger (57) ABSTRACT

The formulation of a profile group of users by defining segments using a function as applied to a single attribute, and combining them with set operations. The segments may be populated by applying the selected function against the selected attribute against multiple users. Then, the profile groups build upon the segments and are populated by applying the selected operations against the selected combination of segments. This represents an efficient mechanism for formulating profile groups based on user attributes.

17 Claims, 6 Drawing Sheets

ProfileGroup 501

| Column Name | Data Type | Allow Nulls |
|---|---|---|
| ProfileGroupId | UniqueId | ☐ |
| ShortId | Int | ☐ |
| Name | Nvarchar(250) | ☐ |
| Description | Nvarchar(500) | ☒ |
| LastMember Count | Int | ☐ |
| LastMember Calcul... | Datetime | ☒ |

ProfileGroupXSegment 502

| Column Name | Data Type | Allow Nulls |
|---|---|---|
| ProfileGroupId | UniqueId | ☐ |
| SegmentId | UniqueId | ☐ |
| IsInclusive | Bit | ☐ |

Segment 401

| Column Name | Data Type | Allow Nulls |
|---|---|---|
| SegmentId | UniqueId | ☐ |
| ShortId | Int | ☐ |
| Name | Nvarchar(250) | ☐ |
| Description | Nvarchar(500) | ☒ |
| AttributeId | UniqueId | ☒ |
| SegmentDefinition FuntionId | Tinyint | ☐ |
| StringParameter1 | Nvarchar(250) | ☒ |
| StringParameter2 | Nvarchar(250) | ☒ |
| IntegerParameter1 | Int | ☒ |
| Integer Parameter2 | Int | ☒ |
| DateTimeParameter1 | Datetime | ☒ |
| DateTimeParameter2 | Datetime | ☒ |
| LastMembership Count | Int | ☒ |
| LastMembership Calculation | Datetime | ☒ |

SEGMENTATION AND PROFILING OF USERS

BACKGROUND

Online applications often provide services to a wide variety of users. Often, in a process called profiling, the online applications attempt to customize the online application based on user attributes. For instance, an online store might advertise specific products based on prior products that the user has purchased. The types of products offered might change depending on further user behaviors.

Typically, the customization of the online application often uses new code in order to implement some types of changes in the profiling operation. Furthermore, the processing time necessary to profile a set of users increases dramatically as the number of users and corresponding attributes increase.

BRIEF SUMMARY

Embodiments described herein relate to the formulation of a profile group of users by defining segments using a function as applied to a single attribute, and combining them with set operations. The segments may be populated by applying the selected function against the selected attribute of multiple users. Then, the profile groups build upon the segments and are populated by applying the selected operations against the selected combination of segments. This represents an efficient mechanism for formulating profile groups based on user attributes.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the formulation of profile groups of multiple users is accomplished by defining segments using a function as applied to a single attribute, and also by defining profile groups using operations (such as set operations) that are to be performed against a combination of segments. The segments may be populated by applying the selected function against the selected attribute against multiple users. Then, the profile groups build upon the segments and are populated by applying the selected operations against the selected combination of segments. This represents an efficient mechanism for profiling user groups based on user attributes.

First, some introductory discussion regarding computing systems will be described with respect to FIG. 1. Then, various embodiments of use of the formulation of segments and profile groups will be described with reference to FIGS. 2 through 6.

Figure 1:
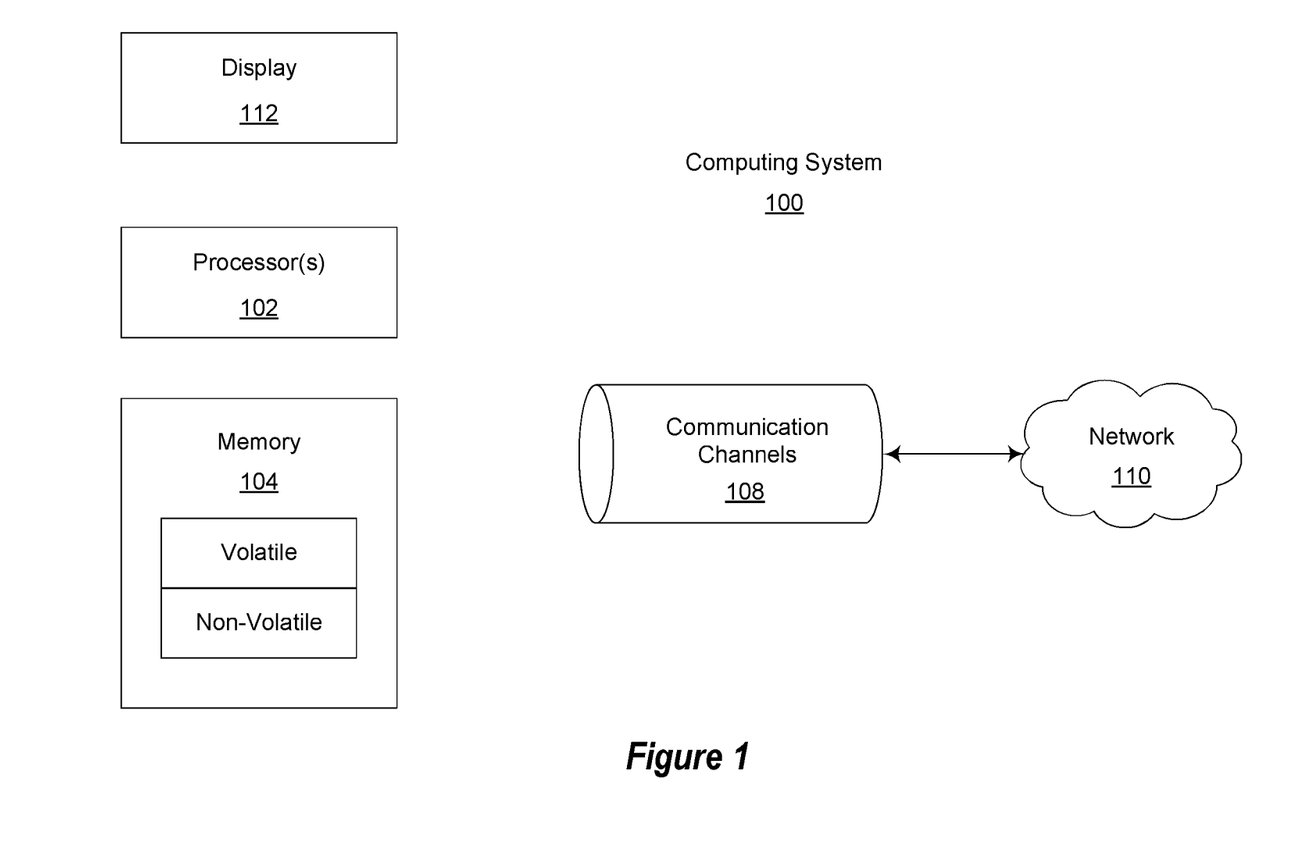
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 also may include a display 112 that may be used to provide various concrete user interfaces, such as those abstractly described herein.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
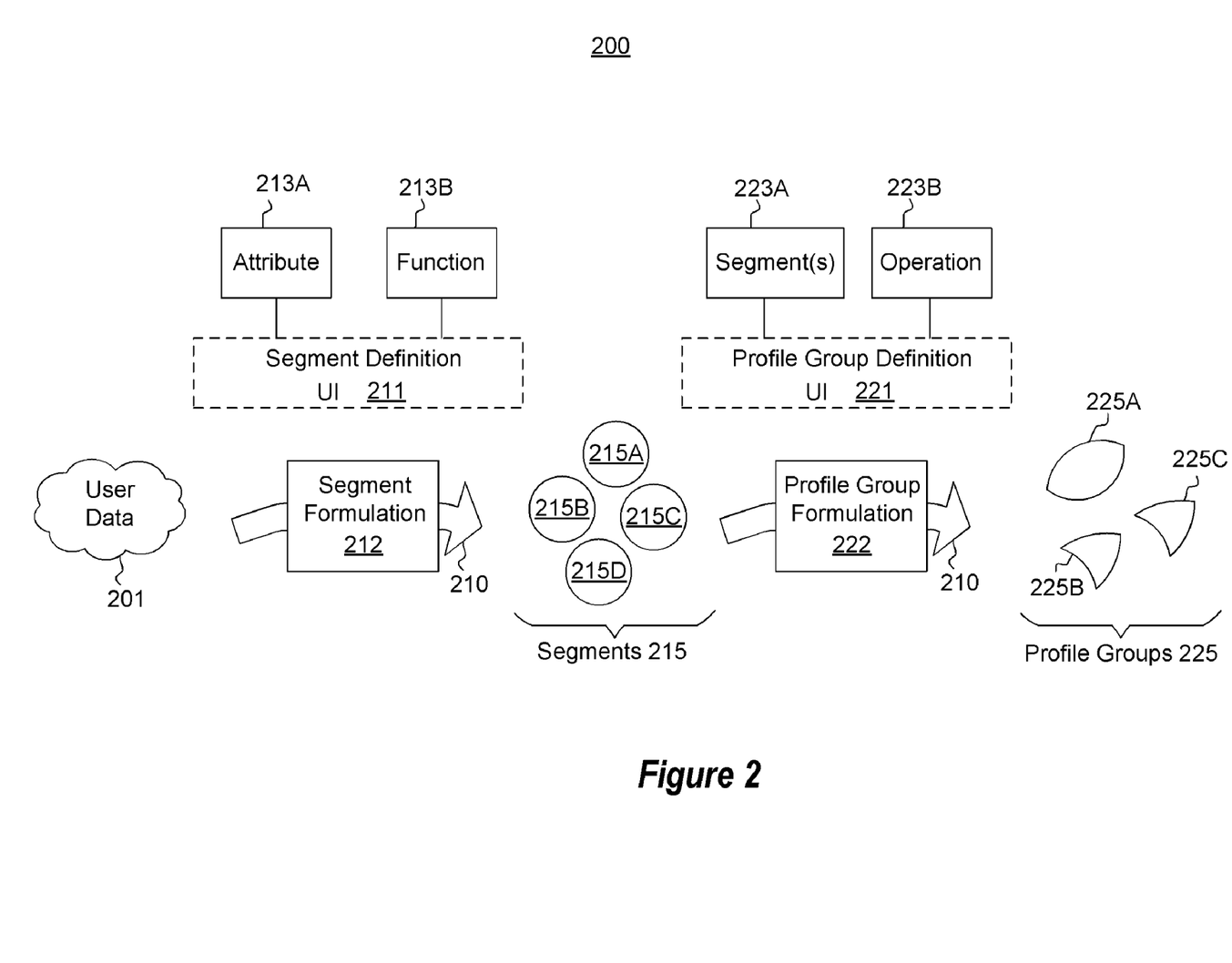
FIG. 2 illustrates an environment that illustrates a general process of the population of segments and the formulation of profile groups as directed through various user interfaces.

FIG. 2 illustrates an environment 200 in which the principles described herein may operate. The environment 200 includes access to user data 201. The user data 201 includes user attributes and are used to populate various user segments as will be described hereinafter. The user data may be obtained from a variety of data sources which may even be distributed.

A segment definition user interface 211 allows users to define one or more user segments. Each user segment is defined according to a single user attribute 213A and a function 213B. The segment definition user interface 211 may offer a number of user attributes to select from, and the user may select one to define each segment. In one embodiment, the user attributes are of a number of different data types. For each data type, the segment definition user interface 211 may also offer a predetermined set of functions to apply against the user attribute to populate the segment. In the example of FIGS. 3 through 6, there are four data types, each corresponding to a predetermined set of functions.

A segment formulation module 212 uses the segment definition to populate each of the defined segments by applying the corresponding function for the segment against the user attribute corresponding to the segment against the user data 201. This process is represented by segment formulation process 210 which represents the formulation of user segments for persisting by a computing system. The process of segment formulation may be applied periodically and/or upon the detection of one or more events.

The result of the segment population 210 is a number of populated segments 215, each segment being populated by or associated with zero or more user identifiers that satisfied the application of the segment function against the user attribute of the segment. In the illustrated case, there are only four such segments 215A, 215B, 215C, 215D, but there is no limit to the number of segments that may be formulated in this way. Furthermore, there is no requirement that all of the segments 215 be populated with the aid of the segment formulation module 212.

A profile group definition user interface 221 allows users to define profile groups by designating an operation 223B that is to be performed on selected segments 223A in order to populate each profile group. The selected segments 223A are taken from the pool of available segments 215. The profile group formulation module 222 automatically populates the defined profile group by performing the designated operation upon the selected segments. This population of profile groups may be performed for all or a subset of the profile groups on a periodic basis, or perhaps in response to an event. Each segment may be reused for multiple profile groups. An example of an operation that might be performed on selected segments in order to populate a profile group might be a designated one or more set operation that takes the set intersection of multiple segments, takes a set union of multiple segments, and/or applies segment exclusions in which members of a segment are specifically excluded from the profile group. The set operations may be performed directly on sets that are either a segment, or the results of a prior set operation.

Figure 3:
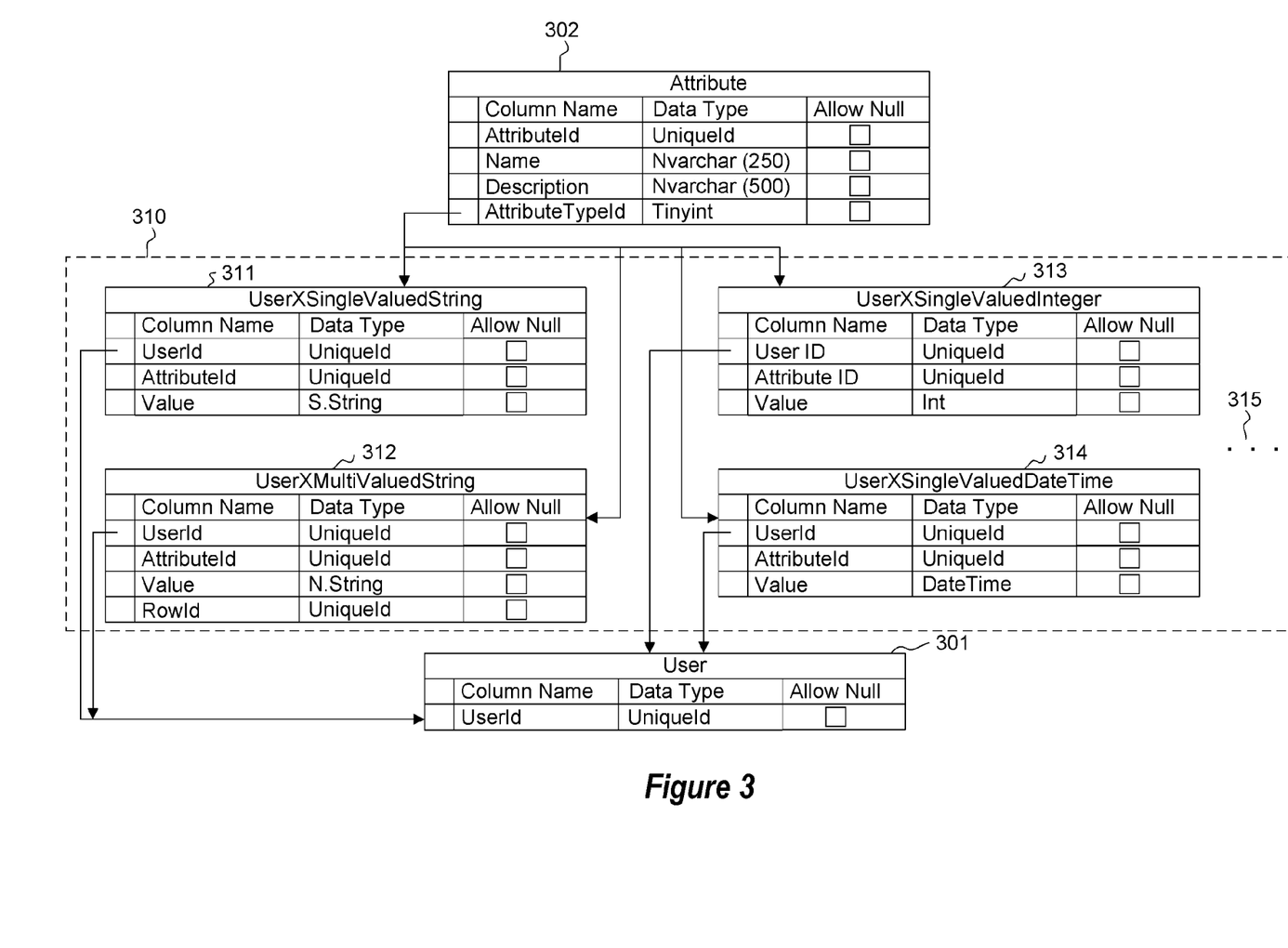
FIG. 3 illustrates relational database table structures involved with the defining of user attributes and their corresponding values.
Figure 4:
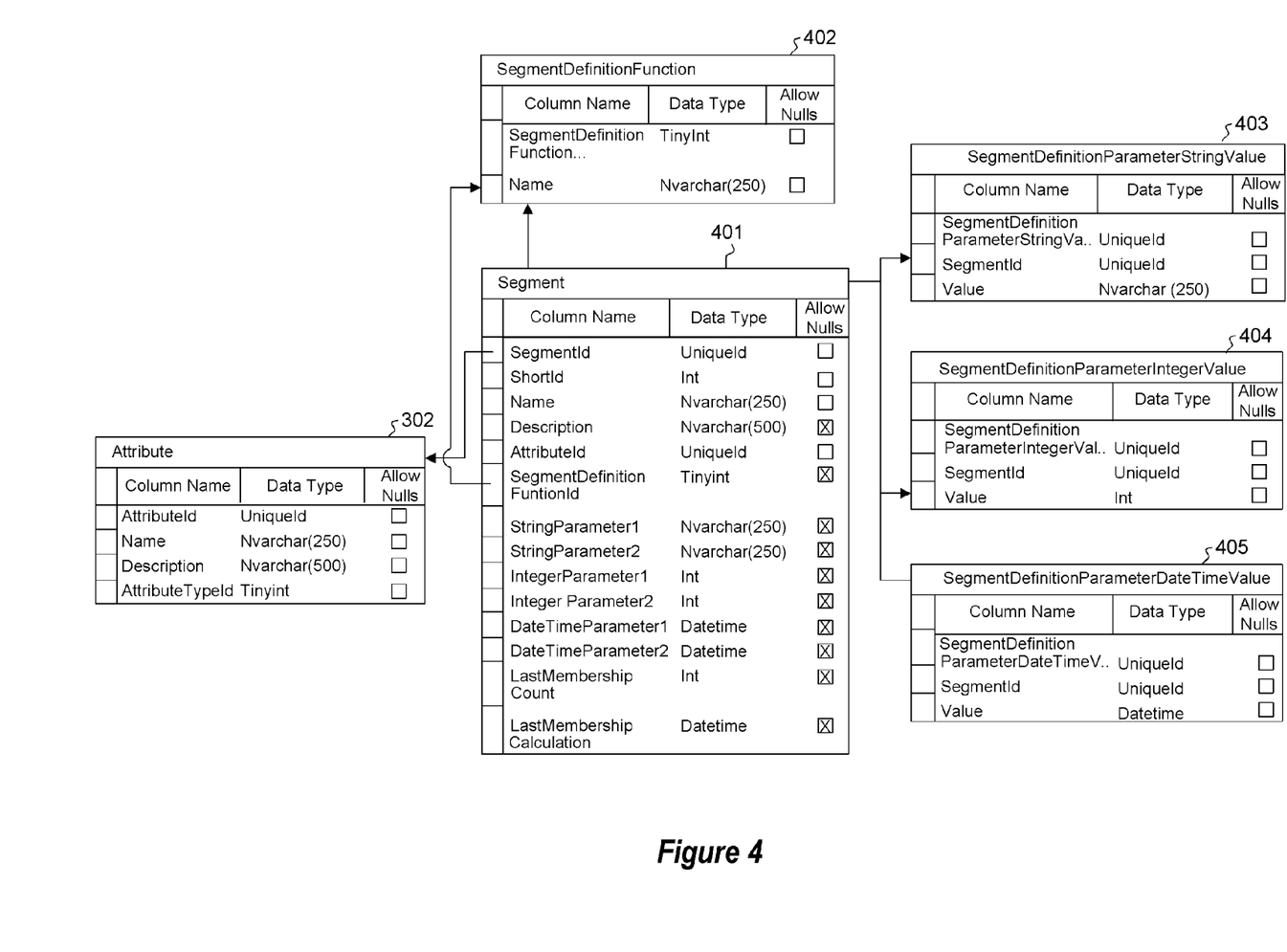
FIG. 4 illustrates relational database table structures involved with the defining of a segment based on a user attribute.
Figure 5:
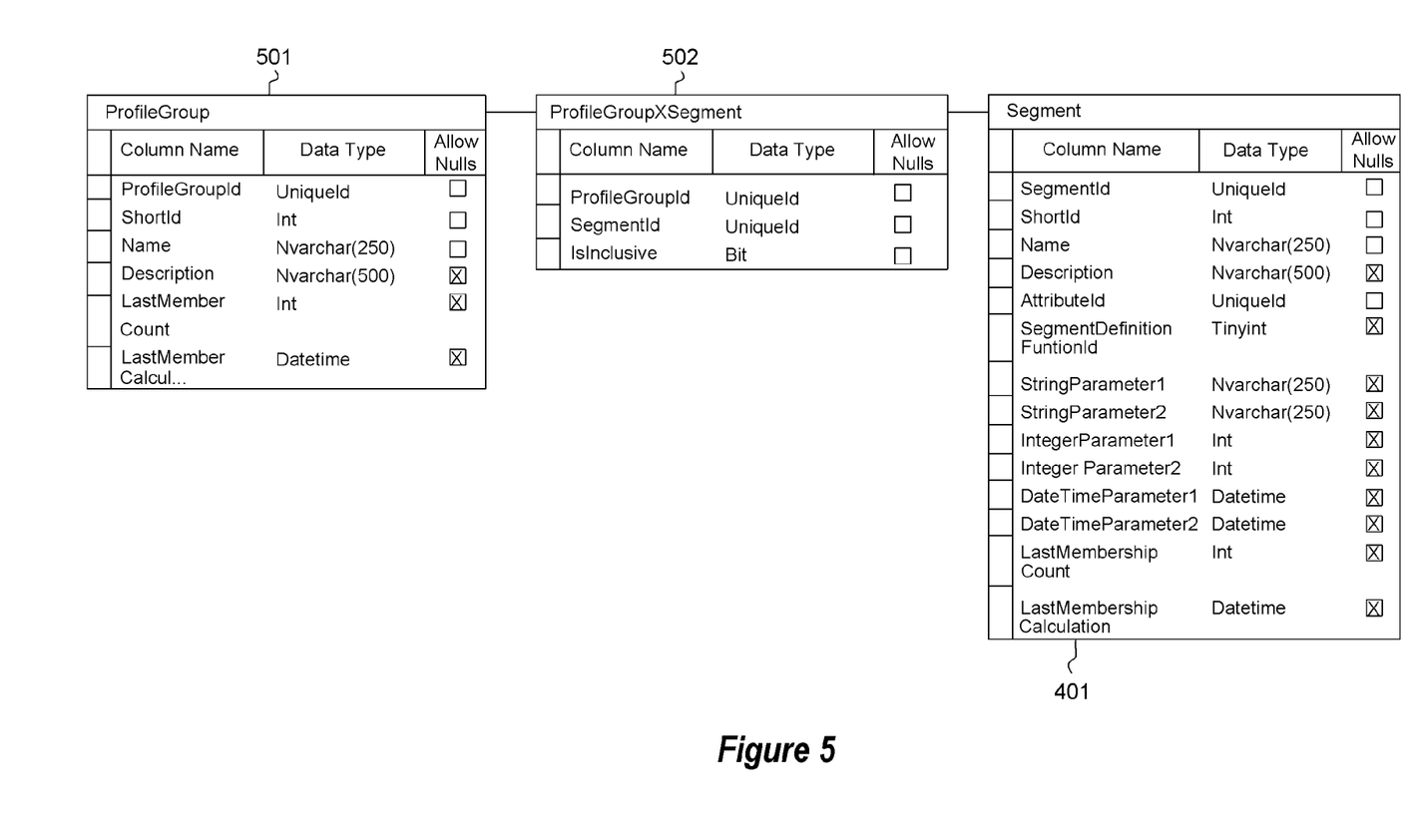
FIG. 5 illustrates relational database table structures involved with the defining of a profile group that is based on one or more segments.
Figure 6:
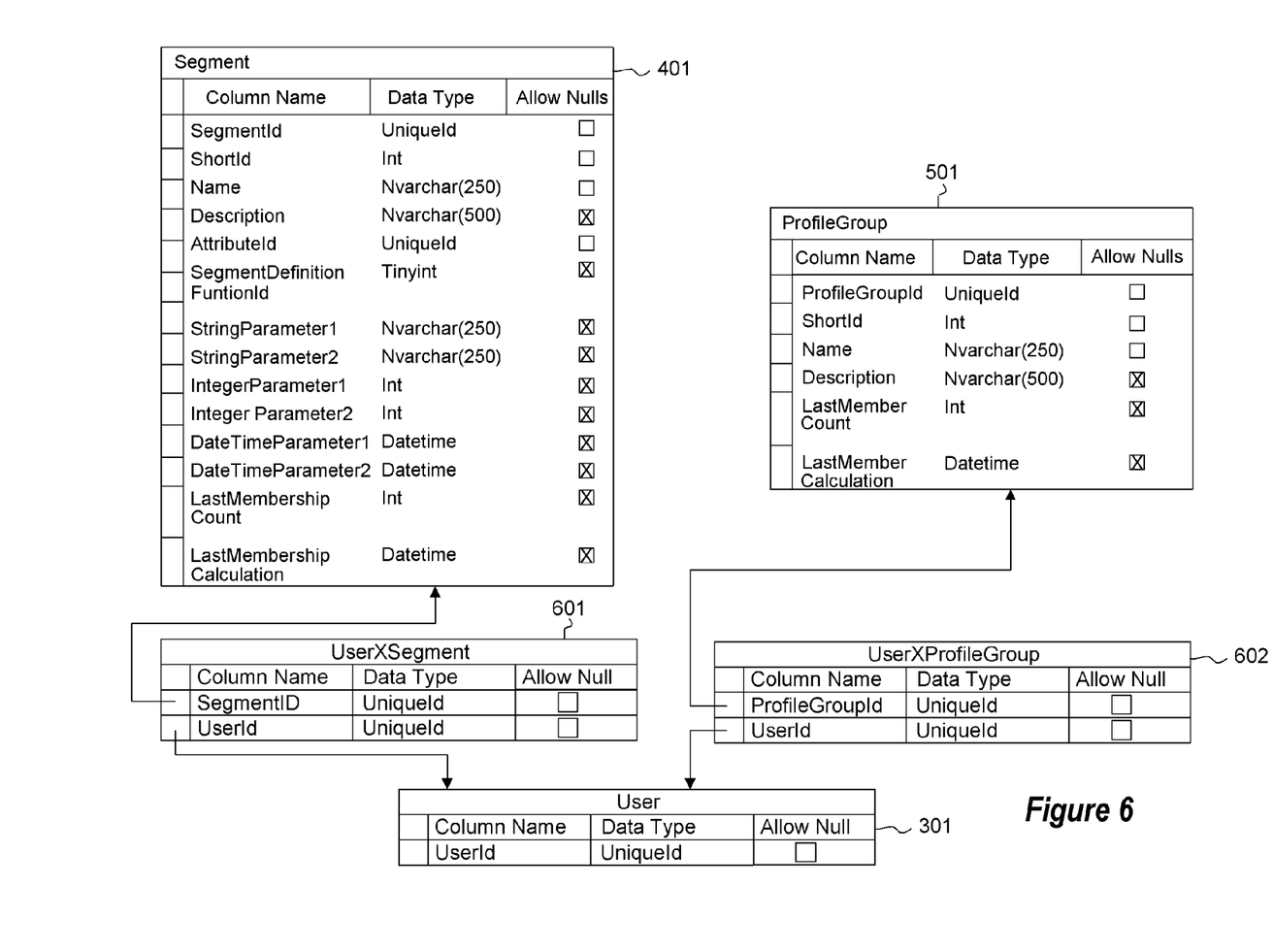
FIG. 6 illustrates relational database table structures involved with the storing of populated segments and profile groups.

FIGS. 3 through 6 each illustrate relational database table structures that permit for efficient determination of such profile groups. FIG. 3 illustrates relational database table structures involved with the defining of user attributes and their corresponding values. FIG. 4 illustrates relational database table structures involved with the defining of a segment based on a user attribute. FIG. 5 illustrates relational database table structures involved with the defining of a profile group that is based on one or more segments. FIG. 6 illustrates relational database table structures involved with the storing of populated segments and profile groups. Each of the figures will now be explained in turn.

FIG. 3 illustrates relational database table structures involved with defining user attributes and their values. While the broader principles described herein are not limited to the manner in which user attributes and their values are maintained for multiple users, the configuration of FIG. 3 is highly efficient as it permits new user attributes to be added and old attributes to be removed without changing the underlying schema of FIG. 3. Furthermore, some of the tables of FIG. 3 have a relation to other tables illustrated in FIGS. 4 through 6. Accordingly, FIG. 3 will now be described in detail.

FIG. 3 includes a user table 301, an attribute table 302, and attribute type tables 310. In the illustrated case, the attribute type tables include a table for each possible data type, each storing values of the attributes of that type for all users. In the example implementation about to be described, there are four types of attributes; namely, single-valued string, multi-valued string, integer, and date/time. Accordingly, the attribute type tables 310 include a UserXSingleValuedString table 311, a UserXMultiValuedString table 312, a UserXSingleValuedInteger table 313, and a UserXSingleValuedDateTime table 314.

Each of the tables of FIGS. 3 through 6 may have one or more columns that are labeled in each of the tables along with the appropriate data type for each column. Each table may have multiple rows of data, each row including appropriate data for each of the corresponding column. In some cases, it is appropriate for a column to be populated with null for any given row, as represented by the "Allow Null" checkbox being checked. In the case of FIG. 3, none of the null checkboxes are checked for any of the columns. However, in the tables of FIGS. 4 through 6, some of the null checkboxes are checked indicating that this column will not always be populated for every row. Some of the tables may include column names not illustrated in FIGS. 3 through 6 for the sake of simplicity as such column names do not relate to the broader principles described herein. For instances, tables might include a creation date, last modified date, created by, last modified by columns, which are used for administration only. Accordingly, only the relevant column names are illustrated.

The user table 301 includes just one column, a UserId, which simply designates a unique identifier for each user being tracked. As will be explained, each user may be populated into one or more segments and one or more profile groups based on their attributes.

The attribute table 302 defines each user attribute of interest, which each attribute corresponding to a row in the table. For each attribute, the attribute table 302 includes an AttributeId uniquely identifying the attribute. Each attribute also has a name (defined by a string), and a description (also defined by a string) which allows the attribute to be identified and understood by human beings having access to the name and description.

Each attribute includes an AttributeTypeId (also perhaps called an AttributeDataTypeId) which identifies (using an integer) the type of attribute. For instance, in the illustrated case, there are four attribute types previously mentioned; namely, single-valued string, multi-valued string, integer, and date/time. Using the AttributeTypeId, the system can infer which of the tables 310 to find the values for that attribute for all users, and which segment functions are application for the attribute selected in a segment.

For example, each row of the UserXSingleValuedString table 311 defines a particular value for a single-valued string attribute for a particular user. A single-valued string attribute would be an attribute of the user for which the user might expect to have only one string value. For instance, a user can live in only one country at a time. Accordingly, a residence country attribute may be expected to be a single-valued string. Other examples of user attributes that may be expected to be a single-valued string include, for example, preferred language, birth country, political affiliation, marital status. Each row of the UserXSingleValuedString table 311 includes a column designating the UserId that the row relates to, a column designating the AttributeId that the row relates to, and value that specifies the actual value of the single-valued string for that user and that attribute. The rows in their entirety may thus define all values for all single-valued string attributes for all users.

Each row of the UserXMultiValuedString table 312 defines a particular value for a multi-valued string attribute for a particular user. A multi-valued string attribute would be an attribute of the user for which the user might expect to potentially having any number (zero, one, or perhaps many) string values. For instance, the multi-valued string could list the products purchased by the user perhaps within a given time period, or perhaps list the countries that the user is estimated to have visited. Each row of the UserXMultiValuedString table 312 includes a column designating the UserId that the row relates to, a column designating the AttributeId that the row relates to, and value that specifies the actual value of the multi-valued string for that user and that attribute. The UserXMultiValuedString table 312 also includes a column specifying a RowId. The composite primary key of the UserId, AttributeId, and RowId enables users to have multiple values for the same attribute. The table 312 in its entirety may thus define all values for all multi-valued string attributes for all users.

Each row of the UserXSingleValuedInteger table 313 defines a particular value for an integer attribute for a particular user. An integer attribute would be an attribute of the user for which the user might expect to potentially be an integer value such as an age, a year of birth, a number of children, a number of log-in attempts in a given time period, a number of purchases made in a given time period, and so forth. Each row of the UserXSingleValuedInteger table 313 includes a column designating the UserId that the row relates to, a column designating the AttributeId that the row relates to, and an integer value that corresponding to that particular user and integer attribute.

Each row of the UserXSingleValuedDateTime table 314 defines a particular value for a date/time attribute for a particular user. Such attributes may be, for example, a date of last log-in, a date of last purchase, a date of purchase of a particular item, a date of birth, a median time of day that the user logs-in, and so forth. Each row of the UserXSingleValuedDateTime table 314 includes a column designating the UserId that the row relates to, a column designating the AttributeId that the row relates to, and a date/time value that corresponding to that particular user and integer attribute.

The horizontal ellipses 315 represents that when other attribute types are added, this can be done without changing the overall schema. For instance, suppose that a new attribute was to be formulated called "HaveCat", and the attribute type is a Boolean, which is a data type not represented by tables 311 through 314. In that case, a new table UserXBoolean may be added as associated with an AttributeTypeId. Also, a new attribute would be defined as a new row in the Attribute table 302 specifying the new AttributeTypeId that maps to the UserXBoolean table. Thus, new attributes may be easily added to the system, even if those new attributes are of a new attribute type.

Thus, the aggregation of tables 301, 302, and 310 allow a flexible arrangement to define values of a variety of attributes for a variety of users.

FIG. 4 illustrates relational database table structures involved with the defining of a segment based on a user attribute. As explained, regardless of how the user attributes are defined, the principles described herein involve the formulation of segments that are based on user attributes. A segment is defined based on a segment definition function being applied to one attribute. Various parameters may also be involved with the segment definition function. The types of segment definition functions may differ depending on the attribute type. The types of parameters will depend on the segment definition function. The following table defines an example implementation of segment definition functions and parameters for each of the example data types in the example of FIGS. 3 through 6:

| Attribute Data Type/Cardinality | Available Function | Parameters | Default Coalesce Value |
|---|---|---|---|
| String/Single Value | SingleValuedStringIsEqualTo | Single string | Empty string |
| | SingleValuedStringIsNotEqualTo | Single string | Empty string |
| | SingleValuedStringIsInList | List of strings | Empty string |
| | SingleValuedStringIsNotInList | List of strings | Empty string |
| String/Multi Valued | MultiValuedStringHasAnyValueEqualTo | Single string | Empty string |
| | MultiValuedStringHasAnyValueNotEqualTo | Single string | Empty string |
| | MultiValuedStringHasAnyValueInList | List of strings | Empty string |
| | MultiValuedStringDoesNotHaveAnyValueInList | List of strings | Empty string |
| | MultiValuedStringHasAnyValueNotInList | List of strings | Empty string |
| DateTime/Single Value | SingleValuedDateTimeIsEqualTo | Single datetime | DateTime.Min |
| | SingleValuedDateTimeIsNotEqualTo | Single datetime | DateTime.Min |
| | SingleValuedDateTimeIsGreaterThan | Single datetime | DateTime.Min |
| | SingleValuedDateTimeIsLessThan | Single datetime | DateTime.Max |
| | SingleValuedDateTimeIsInRange | Two datetimes (min, max) | DateTime.Min |
| | SingleValuedDateTimeIsEqualToTodayPlusOrMinus | Single Integer | DateTime.Min |
| | SingleValuedDateTimeIsInList | List of datetimes | DateTime.Min |
| | SingleValuedDateTimeIsNotInList | List of datetimes | DateTime.Min |
| Integer/Single Value | SingleValuedIntegerIsEqualTo | Single integer | 0 |
| | SingleValuedIntegerIsNotEqualTo | Single integer | 0 |
| | SingleValueIntegerIsGreaterThan | Single integer | 0 |
| | SingleValueIntegerIsLessThan | Single integer | 0 |
| | SingleValueIntegerIsInRange | Two integers (min, max) | 0 |
| | SingleValueIntegerIsInList | List of integers | 0 |
| | SingleValueIntegerIsNotInList | List of integers | 0 |

In this example, if the attribute type that the segment is based on is a single-valued string, there are 4 possible segment definition functions, with the possibility of convenient expansion beyond 4 as described further below. As an example, suppose the attribute is a residence country of the user (i.e., a "residence country attribute"). The segment might be defined by the country attribute using the SingleValuedStringIsEqualTo function with a corresponding string parameter. Thus, a segment based on the country attribute, with the corresponding segment definition function SingleValuedStringIsEqualTo, and with the corresponding string parameter "United States" will include all users whose residence country attribute is "United States".

Also, a segment based on the country attribute, with the corresponding segment definition function SingleValuedStringIsNotEqualTo, and with the corresponding string parameter "United States" will include all users who have a residence country attribute that is not the United States.

A segment based on the country attribute, with the corresponding segment definition function SingleValuedStringIsInList, and with the corresponding list of strings parameters "France, Germany, Luxembourg" will include all users who have a residence country attribute that is one of France, Germany or Luxembourg.

Finally, a segment based on the country attribute, with the corresponding segment definition function SingleValuedStringIsNotInList, and with the corresponding list of strings parameter "France, Germany, Luxembourg" will include all users who have a residence country attribute that is not one of France, Germany or Luxembourg.

In this example, there are four segment definition functions corresponding to segments that are defined by attributes that are single-valued strings. However, more functions may be added. For instance, there might be a new segment definition function ContainsSubstring that returns all users who have a particular string as a portion of the string of the corresponding attribute. There might also be a BeginsWith or EndsWith function that allows filtering by the beginning or ending portion of the string value. Each additional function would result in an additional entry in the SegmentDefinitionFunction table 402. Additionally, a stored procedure corresponding to the additional segment definition function would be added to be used to evaluate the segment membership with the function. The same principle may be used to add segment definition functions to segments defined based on attributes that are multi-valued strings, integers, datetimes, or any other attribute type. Accordingly, the principles described herein may be applied to add specific segment definition functions that are beyond those described herein.

Since not all users will have particular attributes that are used to populate a segment, the application of segment definition functions may cause users without such values to have a coalesce operation applied. Specifically, when a user does not have a value for a particular attribute, a default value is applied just for purposes of applying the segment definition function. In the case of a segment that is defined by a single-valued string, if the user does not have that particular attribute, the user is treated as having an empty string when populating the segment. Similarly, referring to the right column of the table above, when a segment is being formulated based on a particular multi-valued string, users lacking a particular multi-valued string attribute will be treated as having an empty string for that attribute for the purpose of populating the segment. When a segment is being formulated based on a particular datetime, users lacking a particular datetime attribute will be treated as having either an earliest datetime (DateTime.Min) or a latest datatime (DateTime. Max) for that attribute for the purpose of populating the segment. When a segment is being formulated based on a particular integer, users lacking a particular integer attribute will be treated as having a particular integer (e.g., 0 in the above table) for that attribute for the purpose of populating the segment.

One exception is with respect to the SingleValuedDateTimeIsEqualToTodayPlusOrMinus function, which has a parameter of a single integer, but still a coalesce value of DateTime.Min. This is because the comparison is still of two DateTime values, a current DateTime and a reference DateTime. The input integer value is used to derive a DateTime based off of the current DateTime. For example, an input value of 7 to this function would select all users who have a datetime attribute value equal to today plus 7 days (or one week from today).

As an example of the use of coalesce values, suppose there is a segment defined as all users who logged into the website site less than 5 times. When applying the function, there is a question of what to do with users that exist in the system but have never logged in. In other words, there may not be a record in the attribute value table indicating a value of 0 for never logging in. The coalesce operation applied when evaluating the segment definition function allows a "default value" to be applied to users with no values for the attribute. In the above example, the default coalesce value is 0. The coalesce operation is applied to users with no value records when applying the functions as indicated. This enables users to participate in a segment if the default value meets the conditions of the segment definition.

In this example, if the attribute type that the segment is based on is a multi-valued string, there are 5 possible segment definition functions. As an example, suppose the attribute is a citizenship country of a user (i.e., a "citizenship attribute"). In this example, suppose a user is a dual citizen of the United States and the United Kingdom.

The segment might be defined by the citizenship attribute using the MultiValuedStringHasAnyValueEqualTo function with a corresponding single string parameter (in this example, assume the single string "United States" is provided as a parameter). The segment would thus include any user who has "United States" anywhere in the list of countries that they are a citizen of, regardless of whether they are also citizens of other countries as well.

The segment might be defined based on the citizenship attribute using the MultiValuedStringHasAnyValueNotEqualTo function with a corresponding single string parameter (in this example, assume again that the single string "United States" is provided as a parameter). The segment would thus include any user who has specified a country other than the "United States" anywhere in the list of countries that they are a citizen of, regardless of whether they are also citizens of other countries as well. Thus, the user who has a "United States and United Kingdom" citizenship attribute will be in this segment because the United Kingdom is not the United States.

The segment might be defined based on the citizenship attribute using the MultiValuedStringHasAnyValueInList function with a corresponding multi-string parameter (in this example, assume again that "United Kingdom", "France", Germany", "Spain"" is provided as the multi-string parameter). The segment would thus include any user who has any of the listed countries in their citizenship attribute. Thus, the user who has the "United States and United Kingdom" multi-valued string citizenship attribute will be included in the segment because the user has "United Kingdom" listed in the user's citizenship attribute.

The segment might be defined based on the citizenship attribute using the MultiValuedStringDoesNotHasAnyValueInList function with a corresponding multi-string parameter (in this example, assume again that "United Kingdom", "France", Germany", "Spain"" is provided as the multi-string parameter). The segment would thus include any user who does not have any of the listed countries in their citizenship attribute. Thus, the user who has the "United States and United Kingdom" multi-valued string citizenship attribute will not be included in the segment because the user has "United Kingdom" listed in the user's citizenship attribute, which is in the list of four countries.

The segment might be defined based on the citizenship attribute using the MultiValuedStringHasAnyValueNotInList function with a corresponding multi-string parameter (in this example, assume again that "United Kingdom", "France", Germany", "Spain"" is provided as the multi-string parameter). The segment would thus include any user who does have a country listed in their citizenship attribute that is not in the list. Thus, the user who has the "United States and United Kingdom" multi-valued string citizenship attribute will be included in the segment because the user has "United States" listed in the user's citizenship attribute, which is not in the list of four countries.

In this example, if the attribute type that the segment is based on is a date/time, there are 8 possible segment definition functions. As an example, suppose the attribute is last log-in date of a user (i.e., a "last log-in attribute"). In this example, suppose the last log-in attribute value is Jun. 29, 2009.

The segment might be defined by the last log-in attribute using the SingleValuedDateTimeIsEqualTo function with a corresponding single datetime parameter (in this example, assume the datetime value Jun. 30, 2009 is provided as a parameter). The segment would thus include any user who has last logged-in on Jun. 30, 2009. Thus, the user who has a Jun. 29, 2009 last log-in attribute will not be in the segment.

The segment might be defined by the last log-in attribute using the SingleValuedDateTimeIsNotEqualTo function with a corresponding single datetime parameter (in this example, assume the datetime value Jun. 30, 2009 is provided as a parameter). The segment would thus include any user who has last logged-in on a date other than Jun. 30, 2009. Thus, the user who has a Jun. 29, 2009 last log-in attribute will be in the segment.

The segment might be defined by the last log-in attribute using the SingleValuedDateTimeIsGreaterThan function with a corresponding single datetime parameter (in this example, assume the datetime value Jun. 30, 2009 is provided as a parameter). The segment would thus include any user who has last logged-in on a date later than Jun. 30, 2009. Thus, the user who has a Jun. 29, 2009 log-in attribute will not be in the segment.

The segment might be defined by the last log-in attribute using the SingleValuedDateTimeIsLessThan function with a corresponding single datetime parameter (in this example, assume the datetime value Jun. 30, 2009 is provided as a parameter). The segment would thus include any user who has last logged-in on a date earlier than Jun. 30, 2009. Thus, the user who has a Jun. 29, 2009 last log-in attribute will be in the segment.

The segment might be defined by the last log-in attribute using the SingleValuedDateTimeIsinRange function with two corresponding datetime parameters (in this example, assume the datetime values Apr. 1, 2009 and Jun. 30, 2009 are provided as parameters). The segment would thus include any user who has last logged-in between Apr. 1, 2009 and Jun. 30, 2009. Thus, the user who has a Jun. 29, 2009 last log-in attribute will be in the segment.

The segment might be defined by the last log-in attribute using the SingleValuedDateTimeIsEqualtoTodayPlusorMinus function with one corresponding integer parameter (in this example, assume the integer −5 (read "negative five") is provided as a parameter). The segment would thus include any user who has last logged-in on a date that is five days prior to today. Thus, if today is Jun. 30, 2009, the user who has a Jun. 29, 2009 log-in attribute will not be in the segment.

The segment might be defined by the last log-in attribute using the SingleValuedDateTimeIsInList function with a list of corresponding datetime parameters (in this example, assume the datetime values Jun. 28, 2009, Jun. 30, 2009, Jul. 2, 2009 and Jul. 4, 2009 are provided as parameters). The segment would thus include any user who has last logged-in on any of those four days. Thus, the user who has a Jun. 29, 2009 last log-in attribute will not be in the segment because Jun. 29, 2009 is not one of the listed days.

The segment might be defined by the last log-in attribute using the SingleValuedDateTimeIsNotInList function with a list of corresponding datetime parameters (in this example, assume the datetime values Jun. 28, 2009, Jun. 30, 2009, Jul. 2, 2009 and Jul. 4, 2009 are provided as parameters). The segment would thus include any user who has last logged-in on any day other than the four listed days. Thus, the user who has a Jun. 29, 2009 log-in attribute will be in the segment because Jun. 29, 2009 is not one of the listed days.

In this example, if the attribute type that the segment is based on is an integer, there are 7 possible segment definition functions. As an example, suppose the attribute is an age of a user (i.e., an "age attribute"). In this example, suppose the user has an age attribute of 17.

The segment might be defined by the age attribute using the SingleValuedIntegerIsEqualTo function with a corresponding single integer parameter (in this example, assume the integer value 18 is provided as a parameter). The segment would thus include any user who has an age attribute of 18. Thus, the user who has an age attribute of 17 will not be in the segment.

The segment might be defined by the age attribute using the SingleValuedIntegerIsNotEqualTo function with a corresponding single integer parameter (in this example, assume the integer value 18 is provided as a parameter). The segment would thus include any user who has an age attribute of any integer other than 18. Thus, the user who has an age attribute of 17 will be in the segment.

The segment might be defined by the age attribute using the SingleValuedIntegerIsGreaterThan function with a corresponding single integer parameter (in this example, assume the integer value 18 is provided as a parameter). The segment would thus include any user who has an age attribute of any integer greater than 18. Thus, the user who has an age attribute of 17 will not be in the segment.

The segment might be defined by the age attribute using the SingleValuedIntegerIsLessThan function with a corresponding single integer parameter (in this example, assume the integer value 18 is provided as a parameter). The segment would thus include any user who has an age attribute of any integer less than 18. Thus, the user who has an age attribute of 17 will be in the segment.

The segment might be defined by the age attribute using the SingleValuedIntegerIsInRange function with two corresponding two integer parameters (in this example, assume the integer values 18 and 65 are provided as parameters). The segment would thus include any user who has an age attribute of any integer between 18 and 65. Thus, the user who has an age attribute of 17 will not be in the segment.

The segment might be defined by the age attribute using the SingleValuedIntegerIsInList function with multiple corresponding single integer parameters (in this example, assume the integer values 12, 14, 16 and 18 are provided as parameters). The segment would thus include any user who has an age attribute of 12, 14, 16 or 18. Thus, the user who has an age attribute of 17 will not be in the segment.

The segment might be defined by the age attribute using the SingleValuedIntegerIsNotInList function with a list of corresponding single integer parameters (in this example, assume the integer values 12, 14, 16 and 18 are provided as parameters). The segment would thus include any user who has an age attribute other than 12, 14, 16 or 18. Thus, the user who has an age attribute of 17 will be in the segment.

Thus, by correlating specific segment definition functions to particular attribute types, a wide variety of segments may be defined. In one embodiment, each specific segment definition function has a corresponding query that may be applied to populate the segment. For instance, if the tables of FIGS. 3 through 6 were included in a SQL database, there may be a pre-compiled query template for each segment definition function. The parameters provided for the function may then be used to populate the pre-compiled query template to formulate an actionable SQL query that, when submitted to the SQL database, results in the populated segment.

With respect to FIG. 4, this discussion will initially focus on defining the segment only, not on population of a segment with actual user identifiers. A segment is a group that is defined based on one attribute. As described above, a segment definition function is applied on that attribute along with appropriate parameters, if necessary, to define a segment. Once the segment is defined, the segment may be populated by finding users that satisfy the bounds of the segment.

The defining of segments centers around the segment table 401. The tables includes the attribute table 302 previously discussed with respect to FIG. 3. The segment table 401 is also relationally connected to SegmentDefinitionFunction table 402, SegmentDefinitionParameterStringValue table 403, SegmentDefinitionParameterIntegerValue table 404, and Segment DefinitionParameterDateTimeValue table 405.

The segment table 401 defines all of the segments in the system, and includes one segment per row. Each row contains a SegmentId which is a unique identifier that uniquely identifies the segment corresponding to that row. A ShortId, which is an integer value, may also be used to identify the segment. The segment includes a name and a description, in this example, which are string values.

Each row in the segment table 401 also includes an AttributeId that includes the unique identifier for the attribute that the segment is based on. Each row also includes a SegmentDefinitionFunctionId, which is an integer value that uniquely identifies the segment definition function to be applied to the attribute of the segment in order to populate the segment. For instance, the table above includes 24 unique segment functions that were each explained in detail. All that remains to be able to fully define the segment is the parameter(s) that are provided to the segment definition function.

If the segment definition function calls for one exactly one string (e.g., which includes functions SingleValuedStringIsEqualTo, SingleValuedStringIsNotEqualTo, MultiValuedStringHasAnyValueEqualTo, MultiValuedStringHasAnyValueNotEqualTo), then that string is provided in the StringParameter1 column of the row. If the segment definition function calls for a list of strings (e.g., SingleValuedStringIsInList, SingleValuedStringIsNotInList, MultiValuedStringHasAnyValueInList, Multi ValuedStringDoesNotHaveAnyValueInList, or Multi ValuedStringHasAnyValueNotInList), then the SegmentDefinitionParameterStringValue table 403 includes a row for each string in the list. Each row in the table 403 includes the SegmentId that the parameter is related to, and the value of the parameter.

If the segment definition function calls for one exactly one integer (e.g., which includes functions SingleValuedIntegerIsEqualTo, SingleValuedIntegerIsNotEqualTo, SingleValuedIntegerIsGreaterThan, SingleValuedIntegerIsLessThan, or SingleValuedDateTimeIsEqualToTodayPlusOrMinus), then that integer is provided in the IntegerParameter1 column of the row in segment table 401. If the segment definition function calls for exactly two integers (e.g., which includes function SingleValuedIntegerIsInRange), then the lower integer is provided in the IntegerParameter1 column of the row in segment table 401, and the higher integer is provided in the IntegerParameter2 column of the row in segment table 401. If the segment definition function calls for a list of integers (e.g., which is the case in functions SingleValuedIntegerIsInList and SingleValuedIntegerIsNotInList), then the SegmentDefinitionParameterIntegerValue table 404 includes a row for each integer in the list. Each row in the table 404 includes the SegmentId that the parameter is related to, and the value of the parameter.

If the segment definition function calls for one exactly one datetime (e.g., which includes functions SingleValuedDateTimeIsEqualTo, SingleValuedDateTimeIsNotEqualTo, SingleValuedDateTimeIsGreaterThan, or SingleValuedDateTimeIsLessThan), then that datetime is provided in the DateTimeParameter1 column of the row in segment table 401. If the segment definition function calls for exactly two datetimes (e.g., which includes function SingleValuedDateTimeIsInRange), then the earlier datetime is provided in the DateTimeParameter1 column of the row in segment table 401, and the later datetime is provided in the DateTimeParameter2 column of the row in segment table 401. If the segment definition function calls for a list of datetimes (e.g., which is the case in functions SingleValuedDateTimeIsInList and SingleValuedDateTimeIsNotInList), then the SegmentDefinitionParameterDateTimeValue table 405 includes a row for each datetime in the list. Each row in the table 405 includes the SegmentId that the parameter is related to, and the value of the parameter.

The SegmentDefinitionFunction table 402 correlates the SegmentDefinitionFunctionId with an actual name for the segment definition function. New segment definition functions may be added by adding entries to the SegmentDefinitionFunctionId table 402.

The segment table 401 also includes columns for LastMembershipCount, which includes a population count of the users in the given segment for the row, and a LastMembershipCalculation, which includes the date and time that the count was last taken.

Accordingly, the segment table 401 defines multiple segments, each by attribute, segment definition function, and potentially parameters. The tables permit for new segment definition functions to be added without changing the schema. The tables of FIGS. 3 and 4 may be navigated in order to populate the various defined segments as will be described further below with respect to FIG. 6.

As previously discussed, segments are defined based on a single attribute. The segments may even be populated based on a single query, as previously described. The segments may be reused, and need not be recalculated in real-time, but may be periodically recalculated.

The principles described herein permit more complex user groups (called herein profile groups) to be defined that are based on most likely multiple attributes. Such a description of profile groups could be very difficult to accomplish using a code-based solution if the number of users were great, the number of user attributes were large, and the conditions for being included in the profile group were complex. However, using the principles described herein, once the segments are calculated, it may be relatively less processing-intensive to formulate complex profile groups. In accordance with the principles described herein, profile groups may be defined by specifying which segments are to be included, and which segments are to be excluded in a set function.

As an example, one profile group could include users that live in the United States, who have purchased product A or B, who have logged into the system in the last 30 days, who are between 18 and 25 years old, but have not purchased product C. The formulation of that profile group includes first the determination of five discrete segments as follows:

Segment 1—Those users who live in the United States;

Segment 2—Those users who have purchased product A or B;

Segment 3—Those users who logged into the system in the last 30 days;

Segment 4—Those users who are between 18 and 25 years old; and

Segment 5—Those users who have purchased product C.

Segment 1 may have been defined by using the SingleValuedStringIsEqualTo function with single string parameter "United States" applied to a residence country single-valued string attribute.

Segment 2 may have been defined by using the MultiValuedStringHasAnyValueInList function with the parameters being a list of two strings including "Product A" and "Product B" as applied against the users' list of products purchased multi-valued string attribute.

Segment 3 may have been defined by using the SingleValuedDateTimeIsGreaterThan function with the parameter of a datetime equal to 30 days prior to the current date as applied against the users' last log-in datetime attribute.

Segment 4 may have been defined by using the SingleValuedIntegerIsInRange function with the parameters 18 and 25 as applied against the users' age attribute.

Segment 5 may have been defined by using the MultiValuedStringHasAnyValueEqualTo function with the parameter "Product C" as applied against the users' list of products purchases multi-valued string attribute.

The formulation of the profile group based on these segments may be performed by including some of the segments (i.e., segments 1 through 4) and excluding some of the segments (i.e., segment 5). Since the segments are formulated, the formulation of the profile group may also be formulated using an automated query. For instance, the following SQL query might be formulated:

Included Segment 1 (INTERSECT Included Segment 2 (INTERSECT Included Segment 3 (INTERSECT Include Segment 4))) (MINUS Excluded Segment 5)

In fact, regardless of the segments 1 through X that are to be included, and regardless of the segments I, II, through Y that are to be excluded, the query may take the following automated form:

Included Segment 1 (INTERSECT Included Segment 2 (INTERSECT Included Segment 3 ( . . . INTERSECT Include Segment X . . . )))

(MINUS Excluded Segment I) (MINUS Excluded Segment II) ( . . . ) (MINUS Excluded Segment Y)

In this example, set intersection and set exclusion operations are performed. However, set union operations may also be performed. For example, any of the INTERSECT operator in the above example could be INTERSECT operators or UNION operators. In order to determine which segments to include and exclude in order to formulate a profile group, the tables of FIG. 5 may be used in one implementation. FIG. 5 shows the segment table 401 introduced in FIG. 4, and also includes a ProfileGroup table 501 and a ProfileGroupXSegment table 502. The ProfileGroup table 501 defines all of the profile groups, with one profile group per row. The Profile Group table 501 has columns for the ProfileGroupId which uniquely identifies the profile group, a ShortId being an integer identifier for each profile group, and a name and description for each profile group. The table 501 also includes a last membership count and last a time and date of the last membership calculation.

The ProfileGroupXSegment table 502 connects each profile group with the corresponding segments which are to make up the segment, and includes a designation on whether each segment is to be included or excluded. For instance, each row in the ProfileGroupXSegment table 502 maps a segment (via the SegmentId field) to a profile group (via the ProfileGroupId field), and indicates via the IsInclusive bit whether or not the segment is to be included or excluded. There may be multiple rows corresponding to a single profile group where multiple segments are used to define a single profile group. In the above case, where there were 5 segments used to define a profile group, there would be five rows in the ProfileGroupXSegment table 500, each pointing to the same ProfileGroupId, but each pointing also to a different segment, with all but one of the rows specifying that the segment is to be included. Segments may be reused from one profile group to another, without requiring recalculation of the segments themselves. When a profile group is to be calculated, the calculation checks to make sure the segments themselves are populated. This can be done by checking the attribute, function, and parameters used to generate a segment, and making sure they are correct, and making sure the segment was recalculated recently enough to be useful.

There may be a user interface that appears to users that allows the user to interface with segment 401 to formulate segments based on user attributes. This is represented abstractly in the form of the segment definition user interface 211 of FIG. 2. There may also be a user interface that allows users to formulate profile groups based on those segments. This is represented abstractly in the form of the profile group definition user interface 221 of FIG. 2.

For the segment definition user interface 211, the user may be presented with attributes upon which a segment may be built, allowing a user to sort through and select the attribute. Then, based on the attribute type, the possible segment definition functions may be presented in intuitive form. Then based on the selected segment definition function, the user interface may provide appropriate parameter fields that the user may enter the appropriate parameter into. There may also be validation checks to make sure the appropriate data type is entered for the parameter. For instance, for a datetime, the system may validate that the user truly entered an acceptable datetime into the corresponding field. From this data, the appropriate queries may be generated to formulate the segments.

For the profile group definition user interface 221, the system may present the user with the group of available segments, and allow the user to combine those segments, and specify which are to be included and excluded. From this data, the appropriate query may be generated to formulate the profile group. The end result is the identification of a group of users that satisfy potentially very complex profiles based on multiple user attributes. Further, the formulation of the segments and profile groups has allowed increased processing efficiency by basing profile group calculations based on segments, and by reusing segments. Thus, the system may be scalable even where there are numerous users, user attributes, complex profile groups, and many profile groups.

FIGS. 3 through 5 permit the defining of segments and profile groups. The segments and profile groups may be populated by formulating queries based on the segment and profile group definitions. FIG. 6 illustrates how the resulting segments and profile groups may be populated in the context of the user table 301 of FIG. 3.

Referring to FIG. 6, the populated segments are represented in the form of a UserXSegment table 601 that relationally is between the user table 301 and the segment table 401. Each row in the UserXSegment table 601 includes a UserId and a SegmentId which indicates that the identified user belongs to the identified segment. Of course, there will be multiple rows with the same SegmentId when there are multiple users within a segment, and there will be multiple rows with the same UserId if the user is in multiple segments. In one embodiment, there is a user interface through which a user can query which segments a user belongs to, as well as which users belong to a particular segment.

Likewise, the populated profile groups are represented in the form of a UserXProfileGroup table 602 that relationally is between the user table 301 and the ProfileGroup table 501. Each row in the UserXProfileGroup table 602 includes a UserId and a ProfileGroupId which indicates that the identified user belongs to the identified profile group. Of course, once again, there will be multiple rows with the same ProfileGroupId when there are multiple users within a profile group, and there will be multiple rows with the same UserId if the user is in multiple profile groups. In one embodiment, there is a user interface through which a user can query which profile groups a user belongs to, as well as which users belong to a particular profile group.

Once a UserId is associated with one or more segments and one or more profile groups, that SegmentId and ProfileGroupId for those segments and profile groups to which the user belongs may be downloaded to the user, perhaps in the form of a cookie to be stored with the user's browser. The segments and profile group memberships may be recalculated on a period basis, perhaps every 24 hours or so.

When the user logs into an online application, the SegmentIds and ProfileGroupIds of the user may be uploaded with that cookie. If the data is not too stale, some of that information might be used to determine the segments and profile groups to which the user belongs. For instance, the segments and profile group identifiers provided in the cookie might be useful if there has not been a recalculation of segment and profile group memberships in the interim.

Thus, the principles described herein provide an effective way to define and populate segments and profile groups. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical devices having stored thereon computer-executable instructions that, when executed by one or more processors of the computing system, cause the computing system to perform a method of efficiently creating profile groups of users using a two step approach which creates segments of user attributes and then generates profile groups based on the segments, the created profile groups being used to customize a user interface of an application, the method comprising:

an act of storing a plurality of user records, each user record including a plurality of user attributes;

an act of providing a segment definition user interface configured to allow a user to define multiple segments, each segment defined according to a single user attribute and a function to apply to each user record to determine whether the user record is to be included in the segment;

an act of receiving user input to the segment definition user interface that defines a plurality of segments, the user input defining a user attribute and a function for each segment;

an act of providing a profile group definition user interface configured to allow a user to define a plurality of profile groups, each profile group being defined by an operation that determines which user records are to be included in the profile group by specifying two or more segments and one or more Boolean operations to apply to the user records in each set;

an act of automatically populating each of the defined segments by applying the corresponding function for the segment against each of the plurality of user records such that each user record matching the corresponding function for the segment is included in the segment; and after the segments are populated, an act of automatically populating each defined profile group by performing the corresponding operation to determine which user records are to be included in the profile group.

2. The computer program product in accordance with claim 1, wherein the operation defines the corresponding profile group as the intersection or union of two or more segments, and the exclusion of zero or more segments.

3. The computer program product in accordance with claim 2, wherein the operation defines the corresponding profile group as the intersection or union of two or more segments, and the exclusion of one or more segments.

4. The computer program product in accordance with claim 3, wherein the operation defines the corresponding profile group as the exclusion of zero or more segments.

5. The computer program product in accordance with claim 1, wherein the segment definition user interface offers a plurality of user attributes to be selected from, one of which to be selected to define the segment.

6. The computer program product in accordance with claim 5, wherein the plurality of user attributes are each one of a plurality of different data types, wherein for each data type of the plurality of user attributes, the segment definition user interface offers a set of one or more functions specific to the data type, one of which to be selected to define the segment.

7. The computer program product in accordance with claim 1, wherein the act of automatically populating each of the defined segments comprises the following for at least one of the defined segments:

an act of using the selected function and user attribute to automatically populate a pre-compiled query template to thereby form a database query; and an act of automatically submitting the database query to a database of user records.

8. The computer program product in accordance with claim 7, wherein the act of automatically populating the defined profile group comprises the following:

an act of using the corresponding operation and segments to automatically construct a database query; and an act of automatically submitting the database query to a database of segments.

9. The computer program product in accordance with claim 1, wherein the user attributes used to populate the user records are obtained from a plurality of data sources.

10. The computer program product in accordance with claim 9, wherein the plurality of data sources are distributed.

11. The computer program product in accordance with claim 1, wherein the act of automatically populating each of the defined segments is performed on a periodic basis.

12. The computer program product in accordance with claim 1, wherein the act of automatically populating each of the defined segments is performed in response to an event.

13. The computer program product in accordance with claim 1, wherein the act of automatically populating the defined profile group is performed on a periodic basis.

14. The computer program product in accordance with claim 1, wherein the act of automatically populating each of the defined profile group is performed in response to an event.

15. A method for efficiently creating profile groups of users using a two step approach which creates segments of user attributes and then generates profile groups based on the segments, the created profile groups being used to customize a user interface of an application, the method comprising:

an act of storing a plurality of user records, each user record including a plurality of user attributes;

an act of providing a segment definition user interface configured to allow a user to define multiple segments, each segment defined according to a single user attribute and a function to apply to each user record to determine whether the user record is to be included in the segment;

an act of receiving user input to the segment definition user interface that defines a plurality of segments, the user input defining a user attribute and a function for each segment;

an act of providing a profile group definition user interface configured to allow a user to define a plurality of profile groups, each profile group being defined by an operation that determines which user records are to be included in the profile group by specifying two or more segments and one or more Boolean operations to apply to the user records in each set;

an act of automatically populating each of the defined segments by applying the corresponding function for the segment against each of the plurality of user records such that each user record matching the corresponding function for the segment is included in the segment; and after the segments are populated, an act of automatically populating each defined profile group by performing the corresponding operation to determine which user records are to be included in the profile group.

16. The method in accordance with claim 15, wherein the operation defines the corresponding profile group as the intersection or union of two or more segments, and the exclusion of zero or more segments.

17. A method for efficiently creating profile groups of users using a two step approach which creates segments of user attributes and then generates profile groups based on the segments, the created profile groups being used to customize a user interface of an application, the method comprising:

an act of storing a plurality of user records, each user record including a plurality of user attributes;

an act of providing a segment definition user interface configured to allow a user to define multiple segments, each segment defined according to a single user attribute and a function to apply to each user record to determine whether the user record is to be included in the segment;

an act of receiving user input to the segment definition user interface that defines a plurality of segments, the user input defining a user attribute and a function for each segment;

an act of providing a profile group definition user interface configured to allow a user to define a plurality of profile groups, each profile group being defined by an operation that determines which user records are to be included in the profile group by specifying two or more segments and one or more Boolean operations to apply to the user records in each set, wherein a first of the profile groups is defined by an operation that specifies two segments and an intersection operation such that user records that appear in both segments are included in the first profile group;

an act of automatically populating each of the defined segments by applying the corresponding function for the segment against each of the plurality of user records such that each user record matching the corresponding function for the segment is included in the segment; and after the segments are populated, an act of automatically populating each defined profile group by performing the corresponding operation to determine which user records are to be included in the profile group.

* * * * *